A. GRAHAM.
Corn Husker.
No. 18,447.
Patented Oct. 20, 1857.
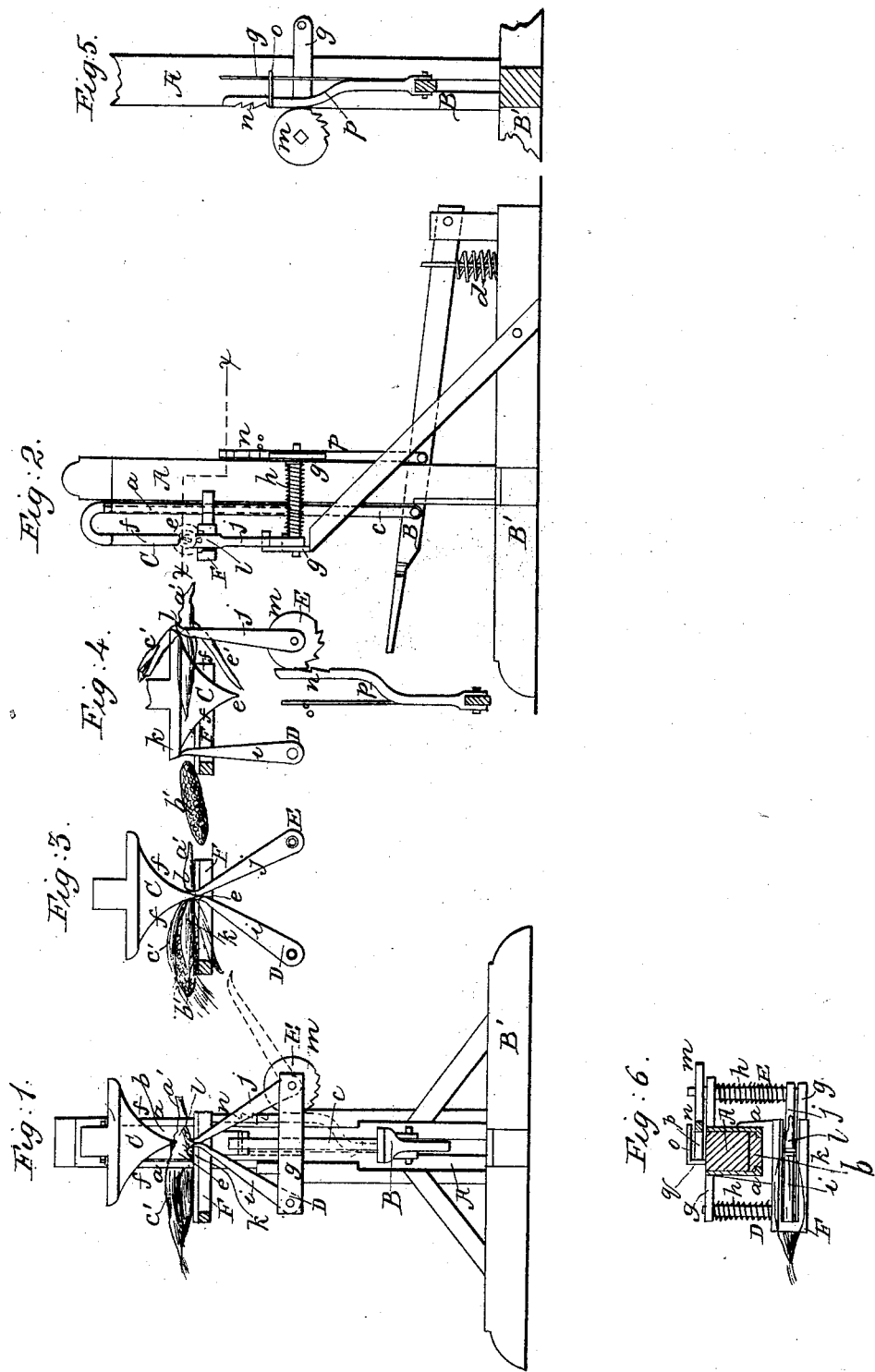

UNITED STATES PATENT OFFICE.

ALDEN GRAHAM, OF ROXBURY, MASSACHUSETTS.

CORN-HUSKER.

Specification of Letters Patent No. 18,447, dated October 20, 1857.

*To all whom it may concern:*

Be it known that I, ALDEN GRAHAM, of Roxbury, in the county of Norfolk and State of Massachusetts, have invented a new and Improved Implement or Device for Husking Corn; and I do hereby declare that the following is a full, clear, and exact description of the same, reference being had to the annexed drawings, making a part of this specification, in which—

Figure 1, is a front view of my improvement. Fig. 2, is a side view of ditto. Fig. 3, is a detached front view of the knife, stripping fork, and slitting arm. Fig. 4 is also a front view of ditto, the device for discharging the butt from the fork being also shown, the parts being in a different position from that shown in Fig. 3. Fig. 5, is a detached view of the device by which the nubbin or butt is discharged from the fork. Fig. 6, is a horizontal section of my improvement taken in the line $(x)$, $(x)$, Fig. 1.

Similar letters of reference indicate corresponding parts in the several figures.

My invention consists in the employment or use of a vertical reciprocating knife, stripping fork and slitting arm or cutter in connection with a grooved bed so arranged and operating that the butts are detached from the ears and the husks stripped therefrom, the butts and husks being discharged from the implement in one direction and the ears in the opposite direction.

To enable those skilled in the art to fully understand and construct my invention I will proceed to describe it.

A represents a vertical post which is secured to a suitable base B′, and $(a)$ $(a)$ are guides attached to said post between which a plate $(b)$ is fitted and allowed to slide freely up and down, the lower end of said plate being connected by a link $(c)$ with a treadle B, which is pivoted to the base and has a spring $(d)$ underneath it, said spring keeping the treadle, when not otherwise acted upon, in an upward position, as shown clearly in Fig. 2. The upper end of the plate $(b)$ is bent or curved forming what is technically termed a "goose-neck," and a knife C of triangular shape is attached to the end of the goose neck, the cutting edge $(e)$ of the knife being at its lowest point, the edges $(f)$ being somewhat curved and blunt, their surfaces being at right angles with the front and back sides of the knife, and not intended to act as cutting surfaces but to serve the office of a wedge as hereinafter shown.

D, E, are two shafts the journals of which are fitted in opposite ends of plates or bars $(g)$ $(g)$ attached to or connected with the post in any proper manner. Around each shaft D, E, a spiral spring $(h)$ is placed and an arm $(i)$ is attached to the shaft D, and an arm $(j)$ is attached to the shaft E. The upper end of the arm $(i)$ is curved a little outward or to the left and is provided with a cutting edge as shown at $(k)$ and the upper end of the arm $(j)$ has a fork $(l)$ formed on it. The springs $(h)$ have a tendency to keep the outer ends of the arms inward or toward each other so that the fork $(l)$ and cutter $(k)$ will, when not otherwise acted upon, be in contact as shown in Fig. 1.

F, is a horizontal bed which is attached to the post A a short distance above the bars $(g)$ $(g)$. The bed F is slotted longitudinally and the upper ends of the arms $(i)$ $(j)$ that is, the cutter $(k)$ and fork $(l)$ pass through the slot in the bed. The back end of the shaft E has a part-pinion $(m)$ upon it, and $(n)$ is a rack which is attached to the treadle B, said rack working through a guide loop $(o)$ attached to the back side of the post A. The rack $(n)$ is composed of a few teeth only formed in a bar $(p)$ and this bar is kept in contact with the periphery of the part pinion by means of a spring $(q)$ as shown more particularly in Figs. 4 and 5.

The operation is as follows:—The ears in the husk are laid one at a time on the bed F the base of the ear, that is, the point of junction of the ear and butt, being directly underneath the cutting edge $(e)$ of knife C, see Figs. 1, 3 and 4, in which $(a')$ is the butt, and $(b')$ the ear, shown in red. The ear being thus placed on the bed, the knife C, is forced down by depressing the treadle B with the foot and the edge $(e)$ of the knife C will enter the butt at its junction with the ear and will split or fracture the butt, so as to detach it from the ear. This is an important feature in the operation. It must be understood the knife C, does not perform the office of a knife only, for the cutting edge $(e)$ does not cut the butt from the ear by cutting alone, for the edge $(e)$ is not sufficiently broad to effect this, see Fig. 2, in which it will be seen that the diameter of the butt is considerably greater than the width of the cutting edge $(e)$. The cutting edge $(e)$ therefore enters the butt and in consequence of the triangular shape of the knife the butt will be fractured transversely and detached from the ear, the butt being partially cut and partially fractured in being detached from the ear, it being understood that the butt owing to natural causes will not readily split longitudinally but will rather break or fracture transversely when acted upon by a wedge. The knife C as it detaches the butt from the ear also forces it upon the fork (*l*) and as the knife C descends its edges (*f*) (*f*) force the two arms (*i*) (*j*) apart, the fork (*l*) causing the butt with husk (*c'*) attached outward to one side of the machine and the ear being forced outward at the opposite side, the cutter (*k*) slitting the husks on the ear so that they may be readily drawn from it by the fork (*l*). The husks of Indian corn it will be understood, are not attached firmly to the ear they merely encompass it, the husks are attached to the butt and hence the necessity of having the butts broken from the ear as described—if they were cut off by the cutting edge (*e*) the fork (*l*) could not strip the husks from the ear for they would be severed from the butts and would be forced from the bed F upon the ears. When the two arms (*i*) (*j*) are fully distended by the knife C, the latter being fully depressed, the ear stripped of its husk will fall off the bed F, see Fig. 4, and as the foot being taken off the treadle B, the treadle will rise by the action of the spring (*d*) and the arm (*i*) will return to its original position by the force of the spring (*h*) on its shaft D. Not so however the arm (*j*) for this as the treadle B rises is still further acted upon by the rack (*n*) and part pinion (*m*) which throw the arm (*j*) farther outward as indicated by the dotted lines in Fig. 1, and at this point the smooth portion of the rack bar (*p*) will come in contact with the part pinion (*m*) and the arm (*j*) being thereby relieved of said pinion and rack, the spring (*h*) of its shaft E throws the arm (*j*) back to its original position. By this means the arm (*j*) is moved through a more extended space than the arm (*i*) and a sudden jerk, or fillip is given it, by said means, so as to throw the butts and husks off the fork (*l*).

Having thus described my invention what I claim as new and desire to secure by Letters Patent, is—

The vertical reciprocating knife C, in combination with the slitting cutter (*k*) stripping fork (*l*) and slotted bed F, arranged and operated substantially as and for the purpose set forth.

ALDEN GRAHAM.

Witnesses:
JOSHUA LEAM,
JAMES BALL.